Figure 1:
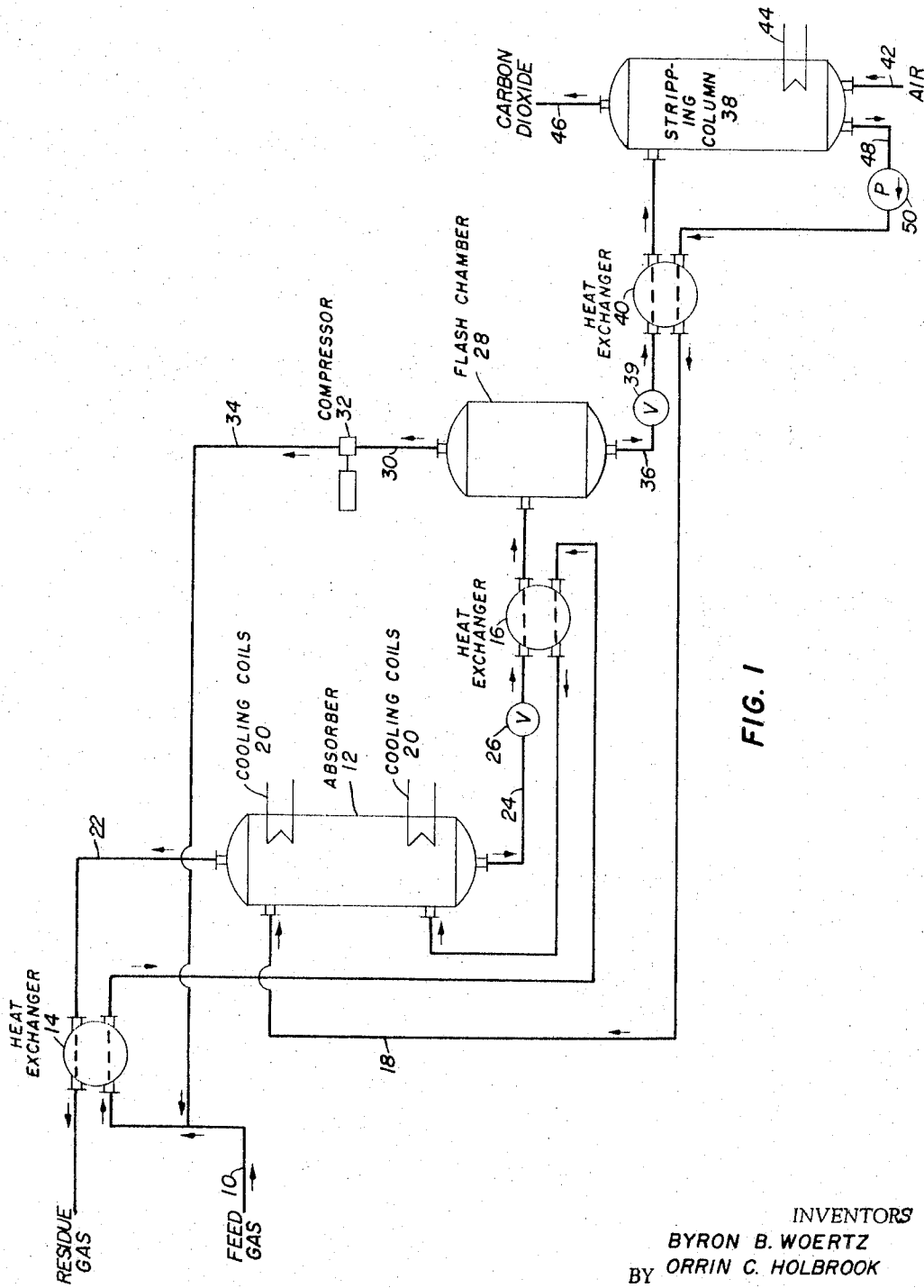

INVENTORS.
BYRON B. WOERTZ
ORRIN C. HOLBROOK

United States Patent Office 3,350,847
Patented Nov. 7, 1967

3,350,847
GAS PURIFICATION USING DINITRILE
Byron B. Woertz, Crystal Lake, Ill., and Orrin C. Holbrook, Andrews, Tex., assignors, by mesne assignments, to Union Oil Company of California, Los Angeles, Calif., a corporation of California
Filed Dec. 31, 1962, Ser. No. 248,771
11 Claims. (Cl. 55—48)

This invention relates to a selective solvent for removing acid gases from admixtures with non-acidic constituents, and more particularly, to an improved process for the removal of carbon dioxide from a gaseous mixture of hydrocarbons and/or other non-acidic constituents containing carbon dioxide by the use of a selective solvent consisting essentially of at least one low-molecular-weight dinitrile of the formula NC—R—CN, wherein R is a lower alkylene group.

The acid gas content of natural gas varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, (1) hot potassium carbonate and (2) mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor. Propylene carbonate extraction is the most economical method of removing large concentrations of carbon dioxide from high pressure methane since its capacity for carbon dioxide is high and its selectivity for extracting carbon dioxide from methane is excellent. However, its selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use with only very "lean" gas, i.e., gas having a low content of ethane and higher-molecular-weight hydrocarbons, its usefulness is restricted to the removal of carbon dioxide from natural gases produced from only a small percentage of existing fields.

In accordance with this invention, we have found that a selective solvent consisting essentially of at least one low-molecular-weight dinitrile of the formula, NC—R—CN, wherein R is a lower straight or branched chain alkylene radical, preferably containing one to three carbon atoms, is an effective solvent for removing carbon dioxide from gaseous mixtures containing hydrocarbons and/or other non-acidic constituents. Preferred solvents coming within the foregoing formula are malononitrile $(CH_2(CN)_2)$, succinonitrile $(NC—C_2H_4—CN)$, glutaronitrile

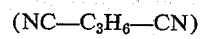

$(NC—C_3H_6—CN)$ and mixtures thereof. The selective solvents of this invention are also generally effective for removing hydrogen sulfide from gaseous mixtures. The lower-boiling dinitrile-containing solvents may be utilized in combination with a second higher boiling, hygroscopic solvent, such as a glycol, to remove additional moisture from the gaseous mixture, as well as to recover the dinitrile which would otherwise be lost in the process.

Since the dinitriles disclosed herein are not good desiccants, dehydration of the gas, if required, may be practiced by conventional methods either before or after acid gas removal. Succinonitrile and glutaronitrile are particularly nonvolatile so that evaporation losses should not be a problem when they are used.

Figure 2:
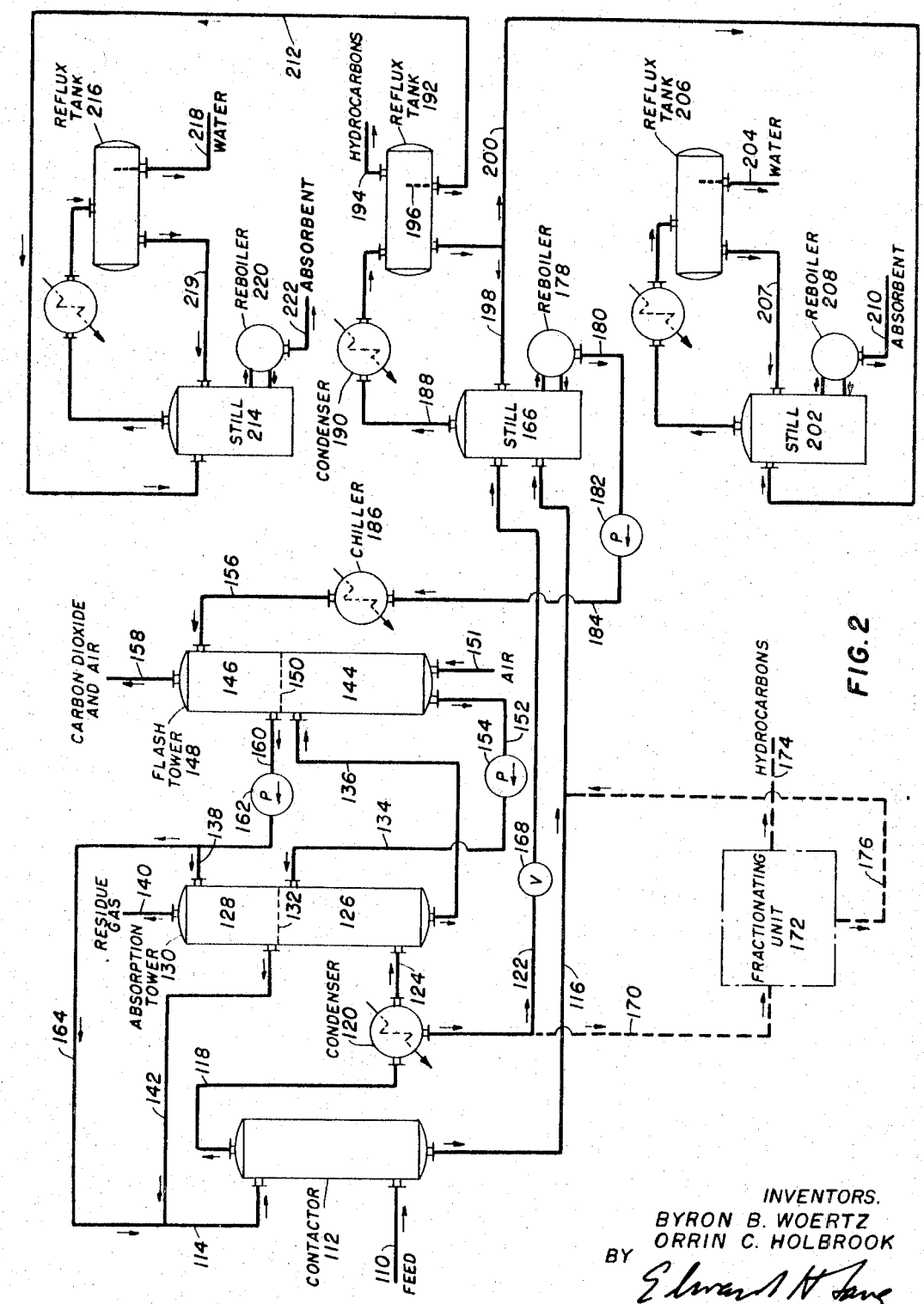

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from natural gas containing significant amounts of ethane and higher-molecular-weight hydrocarbons. A further object of this invention is to provide a process for the removal of carbon dioxide from gaseous mixtures utilizing a superior selective solvent consisting essentially of at least one low-molecular-weight dinitrile. A still further object of this invention is to provide a process for removing carbon dioxide and moisture from gaseous mixtures utilizing a solvent consisting essentially of at least one low-molecular-weight dinitrile in combination with a hygroscopic solvent. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out the process of this invention utilizing a solvent consisting essentially of malononitrile in combination with a higher boiling, hygroscopic solvent, such as triethylene glycol.

The solvents of this invention may be used in the pure form for absorbing carbon dioxide and in admixture with other solvents. For example, a major portion of at least one low-molecular-weight dinitrile may be used in admixture with a minor portion of an inert solvent to modify one of its properties, such as to modify its freezing point, or capacity and/or selectivity for carbon dioxide. The inert solvent is defined as one which is unreactive toward the dinitrile and other solvent constituents of the gas. Examples of the solvents with which the dinitriles may be used in admixture include propylene carbonate, ethylene carbonate, formamide, hydracrylonitrile, methyl acetoacetate, and methyl cyanoacetate. Ethylene carbonate, having a melting point of about 95° F., is herein considered a liquid since most mixtures of it with the other solvents are normally liquid at ambient temperature.

The suitability of the low-molecular-weight dinitriles as selective solvents for carbon dioxide has been demonstrated experimentally in a series of tests wherein the capacity of a number of solvents for carbon dioxide and propane, and the selectivity for carbon dioxide relative to propane, were determined. Solubilities were measured by injecting a measured volume of solvent into an evacuated Dumas bulb, measuring the vapor pressure of the solvent, and then metering in sufficient carbon dioxide to bring the bulb to atmospheric pressure. A series of calculations provided a corrected solubility of carbon dioxide at 80° F. The propane solubilities were similarly measured. The ratio of the carbon dioxide solubility to the propane solubility was termed the selectivity ratio. The results of the comparison of the solvents of this invention and prior art solvents are shown in Table 1. The numbers in parentheses following the names of the prior art solvents refer to the U.S. Patents in which the solvents are identified and claimed as acid gas solvents.

TABLE I

| | Solvent Capacity [1] | | Selectivity Ratio |
|---|---|---|---|
| | $CO_2$ | $C_3H_8$ | $CO_2/C_3H_8$ |
| 50 wt. percent Malononitrile and 50 wt. percent Glutaronitrile | 1.84 | 0.559 | 3.29 |
| 50 wt. percent Succinonitrile and 50 wt. percent Glutaronitrile | 1.86 | 0.442 | 4.21 |
| Glutaronitrile | 2.65 | 1.156 | 2.29 |
| Propylene Carbonate (2,926,751) | 3.20 | 1.84 | 1.74 |
| Triacetin (2,926,752) | 3.54 | 3.03 | 1.17 |
| Butyl Diethylene Glycol Acetate (2,926,753) | 2.98 | 6.83 | 0.436 |

[1] Solubilities determined here are volumes of gas dissolved, measured at 1 atmosphere and 80° F., per volume of solvent, measured at 80° F., when the partial pressure of dry gas above the solvent is one atmosphere This comparison shows that while the capacity of glutaronitrile for carbon dioxide is less than the capacity of propylene carbonate, the best prior art solvent of the table, the selectivity of glutaronitrile for extracting carbon dioxide from propane is over 30% greater than that of propylene carbonate. This superior selectivity more than offsets the lower capacity for carbon dioxide. It can also be seen that the selectivities of the solvent blends of this invention are even more superior than that of glutaronitrile, although the capacities of the blends are less than that of glutaronitrile. The solvent blends can be used where it is desirable to sacrifice carbon dioxide capacity for the sake of having a solvent of greater selectivity. It will be apparent that the solvents of this invention, especially glutaronitrile, possess a rare combination of high boiling point (up to 287° C.), moderate capacity for carbon dioxide, and high selectivity for carbon dioxide relative to hydrocarbons.

In general, this invention contemplates the removal of carbon dioxide from gaseous mixtures containing same by treatment with a selective solvent consisting essentially of at least one low-molecular-weight dinitrile. In addition to the treatment of natural gas containing carbon dioxide, the process of this invention is applicable to the treatment of any carbon dioxide-containing gaseous mixture as long as the solvent has a selectivity for extracting carbon dioxide from the gaseous mixture. For example, the solvent of this invention can be used for removing carbon dioxide from flue gas, or hydrogen, or reformed gas for ammonia synthesis.

The process of this invention is carried out using conventional absorption procedures, wherein the gaseous mixture is contacted with the selective solvent of this invention in either batchwise or counter-current treatment. Successive batchwise extractions also can be used. In the preferred method of practicing the invention, the gaseous mixture to be treated is contacted in a counter-current absorption tower with the absorbent in a continuous flow method. The spent solvent is continuously withdrawn from the absorption tower and is introduced into a flash chamber and/or air-stripping column to remove the absorbed gases. Vacuum flash can be substituted for air stripping, if desired. The regenerated solvent is then recycled through the absorption tower where it is used again.

The extraction process is preferably carried out at temperatures within the range of about 20° to 100° F. although higher and lower temperatures may be utilized. It will be evident that the minimum temperature at which any specific solvent can be used is the minimum temperature at which the composition is a liquid. Pressures from about 100 to 1500 p.s.i.g. (pounds per square inch gauge) may be used. The vaporization loss of the solvent is a factor to be considered in determining the contacting conditions. The maximum contact temperature should be limited to prevent an excessive loss of the solvent. Glutaronitrile is especially non-volatile, having a boiling point similar to that of triethylene glycol. In general, the feed gas and solvent are contacted at a rate of 5 to 150 gallons of solvent per M c.f. of gas.

This invention is best understood by reference to FIGURE 1, wherein a feed gaseous mixture such as natural gas, containing carbon dioxide which is to be removed therefrom, is fed through line 10 into the bottom of absorber 12 after it passes in indirect heat exchange with the residue gas from absorber 12 in heat exchanger 14 and rich absorbent in heat exchanger 16. The absorbent consisting essentially of glutaronitrile which is hereinafter referred to merely as the absorbent, is introduced into the top of absorber 12 through line 18. Absorber 12 can be any suitable absorption column, such as a vertically extended column, containing appropriate packing or trays to assure intimate countercurrent contact of the rising feed mixture with the downflowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about −20° to 100° F. and pressure between about 100 and 1500 p.s.i.g. The amount and rate of carbon dioxide absorption increase directly with an increase in the pressure maintained in the absorption zone, in the lower pressure ranges. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed of.

The rich absorbent, containing absorbed carbon dioxide, is withdrawn from absorber 12 through line 24. Then, the rich absorbent undergoes a controlled pressure reduction, such as by being passed successively through expansion valve 26 and heat exchanger 16 into flash chamber 28. Flash chamber 28 is maintained at a pressure below the pressure of absorption column 12, but above atmospheric pressure, e.g., about 50 to 400 p.s.i.g. so that the flash gas is about 5 to 10% of the inlet gas in line 10 at standard temperature and pressure. As the absorbent undergoes pressure reduction, it becomes cooled due to the loss of heat of absorption acquired in absorber 12 and expansion of absorbed carbon dioxide to a lower partial pressure. Part of the absorbed carbon dioxide and nonacidic constituents of the feed gas are withdrawn from flash chamber 28 through line 30. The gases in line 30 are compressed in compressor 32 and passed through line 34 to be mixed with the feed gas before it passes through exchanger 14. The partially desorbed absorbent is withdrawn from flash chamber 28 through line 36 and fed into stripping column 38 after it has passed successively through expansion valve 39 and exchanger 40, in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed from the absorbent and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to further cool the lean absorbent after it has passed though heat exchanger 40.

Other alternative absorption-resorption processes will be apparent to those skilled in the art. For example if it is not desired to limit the loss of the nonacidic constituents of the feed gas, the rich absorbent may be desorbed in a flash or stripping step and the off-gases disposed of as desired. The partially desorbed absorbent may then be recycled to the absorber or introduced into a stripping column to remove the last vestages of absorbed carbon dioxide before it is recycled to the absorption column. The residue gas from the absorber and/or the flash gas may be passed through a solid bed of an adsorbent, such as silica gel, activated alumina, activated carbon or a synthetic zeolite, to separate vaporized absorbent therefrom.

In an alternative embodiment of this invention, the absorbent of this invention may be used in combination with a second higher boiling hygroscopic solvent which is absorptive of it, to avoid the uneconomically high solvent losses which are common in conventional processes. The hygroscopic solvent serves to remove moisture from the feed gaseous mixture, as well as to recover the absorbent which would otherwise be lost in the product gas stream. The hygroscopic solvent is any of the polyhydric alcohols or glycols which have been proposed or used for moisture extraction, such as tetraethylene glycol, diethylene glycol, triethylene clycol and aqueous solutions thereof.

This alternative embodiment is best understood by reference to FIGURE 2 wherein the numeral 110 represents the line through which the gas to be treated—for example, a natural gas consisting of hydrocarbons, carbon dioxide, and moisture—is fed into the bottom of contactor 112, in which it is countercurrently contacted with a mixture of a low-molecular-weight dinitrile and a hygroscopic solvent entering through line 114. Contactor 112, which may contain any suitable type and arrangement of trays or baffles as required for intimacy of contact between the absorbent mixture and feed gas, is preferably maintained at a temperature within the range of about 0° to 100° F. and pressure within the range of about 100 to 1500 p.s.i.g., although higher and lower temperatures and pressures may be used. A suitable example of the absorbent mixture entering contactor 112 through line 114 is 75 to 95% by weight of a glycol, such as triethylene glycol, 0 to 5% by weight of malononitrile and 0 to 20% by weight of water, the amount of water being indirectly proportional to the contacting temperature to reduce the glycol viscosity. In contactor 112, much of the water content of the feed gas stream is taken up by the glycol solvent. Glycol absorbent, containing water and some malononitrile absorbent, is withdrawn from contactor 112 through line 116. The resulting natural gas-malononitrile absorbent mixture leaves contactor 112 through line 118, and flows to condenser 120, in which its temperature is reduced to absorption temperature, for example, 100° to 110° F. Condensed hydrocarbons, malononitrile and/or water are withdrawn from condenser 120 through line 122.

The chilled, uncondensed components of the natural gas-malononitrile absorbent mixture pass from condenser 120 through line 124 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the down-flowing absorbent. In section 126, the gas is countercurrently contacted with malononitrile absorbent entering through line 134, which removes at least part of the acid gas constituents. Rich malononitrile containing absorbed carbon dioxide is withdrawn from absorption tower 130 through line 136. The scrubbed natural gas passes on upward in tower 130 past trap-out tray 132 into upper section 128, where it is countercurrently contacted with the glycol absorbent entering through line 138. The triethylene glycol absorbent scrubs any vaporized malononitrile absorbent from the natural gas and the scrubbed natural gas product of reduced carbon dioxide content is withdrawn through line 140 to a suitable receiver or other disposition. The mixture of glycol and malononitrile absorbents from upper section 128 is trapped on tray 132, and is withdrawn through line 142 and introduced into contactor 112 through line 114.

The malononitrile absorbent in line 136 enters a combined flashing and contacting zone which, as illustrated, may be lower flashing zone 144 and upper contacting zone 146 in a single vertically extended flash tower 148, with the upper and lower sections being separated by liquid trap-out tray 150. The rich malononitrile absorbent enters flash zone 144, which is maintained at a pressure below the absorption column pressure and usually at about atmospheric pressure, where it undergoes pressure reduction to flash-off absorbed carbon dioxide. If desired, air or other inert stripping gas is introduced into zone 144 through line 151. The lean malononitrile absorbent is withdrawn from flash zone 144 through line 152 and is introduced back to absorption tower 130 by pump 154 through line 134. Carbon dioxide and stripping gas containing entrained and vaporized malononitrile absorbent leaves flash zone 144, and it passes through trap-out tray 150 into contacting zone 146 where it is countercurrently contacted with triethylene glycol solvent entering through line 156. The triethylene glycol scrubs any vaporized malononitrile absorbent from the carbon dioxide, and the carbon dioxide and stripping gas are withdrawn through line 158 to be disposed of as desired. This carbon dioxide is suitable for use in miscibly flooding oil reservoirs, if stripping gas contamination is low.

The resulting mixture of the triethylene glycol and malononitrile absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent, containing water and malononitrile in line 116 and the condensate in line 122 are introduced into glycol still 166, with the condensate in line 122 being introduced into still 166 at a point higher than that where the liquid in line 116 is introduced. Alternatively, with valve 168 closed, condensate in line 122 is passed through line 170 into fractionating unit 172 where hydrocarbons are recovered from the condensate. The hydrocarbons are removed through line 174 and the remaining glycol and malononitrile are withdrawn through line 176 and mixed with the liquid in line 116.

Glycol still 166 is equipped with reboiler 178 from which regenerated triethylene glycol is withdrawn through line 180 and forced by pump 182 successively through line 184, chiller 186, and line 156 to contacting zone 146 of vessel 148. Overhead from still 166, comprising malononitrile absorbent, water, and hydrocarbons, is passed through line 188 and condenser 190 into reflux tank 192. Noncondensable hydrocarbon gases are vented from reflux tank 192 by line 194. Since the malononitrile absorbent is heavier than water and not completely water miscible, it is separated from the water in reflux tank 192 by providing reflux tank with short standpipe 196 through which the lighter water layer is withdrawn. The heavier malononitrile absorbent layer is withdrawn from reflux tank 192 and part of it is returned to still 166, as reflux, through 198 and the remaining portion is passed through line 200 into malononitrile still 202. Water, which is carried overhead from still 202 with some malononitrile, is removed from reflux tank 206 through line 204 and either discarded or combined with the water withdrawn through standpipe 196. Malononitrile carried overhead from still 202 with the water, and separated therefrom in reflux tank 206, is returned to still 202 through line 207. Substantially dry malononitrile absorbent is removed from reboiler 208 through line 210 and returned to the system.

The water separated from the malononitrile in reflux tank 192 by standpipe 196 is passed through line 212 into water still 214. Water, which is carried overhead from still 214 with some malononitrile is removed from reflux tank 216 through line 218, and discarded, while the malononitrile is returned to still 214 from reflux tank 192 through line 219. Malononitrile is withdrawn from reboiler 220 of still 214 through line 222 and returned to the system. As hereinbefore pointed out, the water removed from reflux tank 206 may be combined with the water in line 212 before it is introduced into still 214.

Since a small amount of water in the malononitrile absorbent is not especially detrimental to its effectiveness in absorbing carbon dioxide, malononitrile still 202 may not be required in many instances. In any case, glycol still 166, malononitrile still 202, and water still 214 need be only relatively small units.

*Example I*

Tables II to VII are illustrative of the process streams of the process depicted in FIGURE 1 wherein a natural gas mixture is contacted with the lean absorbent in absorber 12, containing ten theoretical trays. One hundred pound mols of the natural gas per unit time are contacted in different runs with the solvents in such amounts that the residue gas contains about 2 vol. percent of carbon dioxide. The rich absorbent withdrawn from absorber 12 is flashed isothermally in flash chamber 28 and the pressure of the partially desorbed absorbent withdrawn from flash chamber 28 is reduced to atmospheric pressure in stripping column 38. Tables II and III give the compositions of the process streams where the gas is contacted with solvents of this invention and, for the purpose of comparison, Tables IV and V give the composition of the process streams wherein the gas is contacted with the propylene carbonate, while Tables VI and VII give the composition of the process streams where the gas is contacted with propionitrile, as representative of mononitriles. In the following tables the gas and solvent volumes are measured at 14.7 p.s.i.a. and 60° F.

In comparing the effectiveness of glutaronitrile, propylene carbonate, and propionitrile as selective solvents for carbon dioxide where the absorber is maintained at the same conditions and the rich absorbent is flashed at the same conditions (Tables II, IV and VI), the lower capacity of glutaronitrile for carbon dioxide is indicated by the solvent circulation rates. However, the superior selectivity for carbon dioxide of glutaronitrile can readily be seen by comparing the "Percent Loss" columns which indicate the percentage of each of the feed gas components lost through line 46.

TABLE II

Solvent: Glutaronitrile
Absorber Maintained at 0° F. and 600 p.s.i.a.
Absorbent Circulation Rate of 27.7 Gal./M c.f. of Feed Gas
Rich Absorbent Flashed at 0° F. and 150 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent loss |
|---|---|---|---|---|---|---|---|
| | | Mols | Mol percent | | | | |
| Methane | 72.0 | 71.54 | 88.87 | 1.91 | 1.45 | 0.46 | 0.64 |
| Ethane | 6.0 | 5.55 | 6.89 | 0.72 | 0.27 | 0.45 | 7.5 |
| Propane | 2.0 | 1.48 | 1.84 | 0.63 | 0.11 | 0.52 | 26.0 |
| CO₂ | 19.0 | 1.61 | 2.00 | 18.62 | 1.23 | 17.39 | 91.5 |
| n-Butane | 1.0 | 0.32 | 0.40 | 0.73 | 0.05 | 0.68 | 68.0 |
| Absorbent | 0 | 0 | 0 | 92.76 | 0 | 0 | |
| Total | 100.00 | 80.50 | 100.00 | 115.37 | 3.11 | 19.50 | |

TABLE III

Solvent: Glutaronitrile
Absorber Maintained at 70° F. and 600 p.s.i.a.
Absorbent Circulation Rate of 72.3 Gal./M c.f. of Feed Gas
Rich Absorbent Flashed at 70° F. and 150 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent loss |
|---|---|---|---|---|---|---|---|
| | | Mols | Mol percent | | | | |
| Methane | 72.0 | 71.49 | 88.76 | 3.99 | 3.48 | 0.51 | 0.71 |
| Ethane | 6.0 | 5.54 | 6.88 | 1.27 | 0.81 | 0.46 | 7.7 |
| Propane | 2.0 | 1.49 | 1.85 | 0.92 | 0.40 | 0.51 | 25.5 |
| CO₂ | 19.0 | 1.60 | 1.99 | 22.40 | 5.01 | 17.38 | 91.5 |
| n-Butane | 1.0 | 0.42 | 0.52 | 0.79 | 0.21 | 0.58 | 58.0 |
| Absorbent | 0 | 0 | 0 | 241.67 | 0 | 0 | |
| Total | 100.00 | 80.54 | 100.00 | 271.04 | 9.91 | 19.44 | |

TABLE IV

Solvent: Propylene Carbonate  
Absorber Maintained at 0° F. and 600 p.s.i.a.  
Absorbent Circulation Rate of 26.2 Gal./M c.f. of Feed Gas  
Rich Absorbent Flashed at 0° F. and 150 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent loss |
|---|---|---|---|---|---|---|---|
| | | Mols | Mol percent | | | | |
| Methane | 72.0 | 71.56 | 89.34 | 2.53 | 2.09 | 0.44 | 0.61 |
| Ethane | 6.0 | 5.46 | 6.81 | 0.99 | 0.45 | 0.54 | 9.0 |
| Propane | 2.0 | 1.33 | 1.66 | 0.87 | 0.20 | 0.67 | 33.5 |
| $CO_2$ | 19.0 | 1.60 | 2.00 | 19.56 | 2.16 | 17.40 | 91.6 |
| n-Butane | 1.0 | 0.15 | 0.19 | 0.95 | 0.10 | 0.85 | 85.0 |
| Absorbent | 0 | 0 | 0 | 98.43 | 0 | 0 | |
| Total | 100.00 | 80.10 | 100.00 | 123.33 | 5.00 | 19.90 | |

TABLE V

Solvent: Propylene Carbonate  
Absorber Maintained at 70° F. and 600 p.s.i.a.  
Absorbent Circulation Rate of 66.9 Gal./M c.f. of Feed Gas  
Rich Absorbent Flashed at 70° F. and 150 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent loss |
|---|---|---|---|---|---|---|---|
| | | Mols | Mol percent | | | | |
| Methane | 72.0 | 71.33 | 89.63 | 4.91 | 4.24 | 0.67 | 0.93 |
| Ethane | 6.0 | 5.36 | 6.73 | 1.63 | 0.99 | 0.64 | 10.7 |
| Propane | 2.0 | 1.19 | 1.50 | 1.32 | 0.51 | 0.81 | 40.5 |
| $CO_2$ | 19.0 | 1.63 | 2.05 | 24.11 | 6.74 | 17.37 | 91.4 |
| n-Butane | 1.0 | 0.07 | 0.09 | 1.20 | 0.27 | 0.93 | 93.0 |
| Absorbent | 0 | 0 | 0 | 253.24 | 0 | 0 | |
| Total | 100.0 | 79.58 | 100.00 | 286.41 | 12.75 | 20.42 | |

TABLE VI

Solvent: Propionitrile  
Absorber Maintained at 0° F. and 600 p.s.i.a.  
Absorbent Circulation Rate of 16.6 Gal./M c.f. of Feed Gas  
Rich Absorbent Flashed at 0° F. and 150 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent loss |
|---|---|---|---|---|---|---|---|
| | | Mols | Mol percent | | | | |
| Methane | 72.0 | 7.68 | 92.02 | 5.29 | 3.97 | 1.32 | 1.8 |
| Ethane | 6.0 | 4.37 | 5.69 | 2.38 | 0.76 | 1.63 | 27.2 |
| Propane | 2.0 | 0.21 | 0.27 | 2.03 | 0.25 | 1.79 | 89.5 |
| $CO_2$ | 19.0 | 1.55 | 2.02 | 19.70 | 2.25 | 17.45 | 91.8 |
| n-Butane | 1.0 | 0 | 0 | 1.05 | 0.05 | 1.00 | 100.0 |
| Absorbent | 0 | 0 | 0 | 75.00 | 0 | 0 | |
| Total | 100.00 | 76.81 | 100.00 | 105.45 | 7.28 | 23.19 | |

TABLE VII

Solvent: Propionitrile  
Absorber Maintained at 70° F. and 600 p.s.i.a.  
Absorbent Circulation Rate of 42.0 Gal./M c.f. of Feed Gas  
Rich Absorbent Flashed at 70° F. and 200 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent loss |
|---|---|---|---|---|---|---|---|
| | | Mols | Mol percent | | | | |
| Methane | 72.0 | 69.47 | 92.22 | 9.30 | 6.77 | 2.53 | 3.5 |
| Ethane | 6.0 | 4.12 | 5.47 | 3.05 | 1.17 | 1.88 | 31.3 |
| Propane | 2.0 | 0.22 | 0.29 | 2.21 | 0.43 | 1.78 | 89.0 |
| $CO_2$ | 19.0 | 1.50 | 1.99 | 21.44 | 3.94 | 17.50 | 92.1 |
| n-Butane | 1.0 | 0.02 | 0.03 | 1.15 | 0.17 | 0.98 | 98.0 |
| Absorbent | 0 | 0 | 0 | 190.00 | 0 | 0 | |
| Total | 100.00 | 75.33 | 100.00 | 227.15 | 12.48 | 24.67 | |

The embodiments of the invention in which an exclusive property or privilege is claimed are defined as follows:

1. The process of removing gaseous acid gas selected from the group consisting of carbon dioxide and hydrogen sulfide from admixture with gaseous $C_1$—$C_3$ alkane hydrocarbons which comprises contacting said gaseous mixture with an acid gas absorbent consisting essentially of at least one low-molecular-weight dinitrile of the formula, NC—R—CN, wherein R is a lower alkylene group, under conditions resulting in selective absorption of said acid gas, and separating the unabsorbed components of said gaseous admixture from said absorbent.

2. The process according to claim 1 in which said gaseous admixture is passed through an absorption zone at superatmospheric pressure in countercurrent contact with said solvent and a stream of rich solvent is removed from said absorption zone and absorbed acid gas is separated therefrom.

3. The process according to claim 1 in which said acid gas is carbon dioxide and said absorbent consists essentially of a solvent selected from the group consisting of malononitrile, succinonitrile, glutaronitrile, and mixtures thereof.

4. A process according to claim 3 in which said solvent is glutaronitrile.

5. The process according to claim 3 in which said solvent is malononitrile.

6. The process according to claim 3 in which said solvent is succinonitrile.

7. The process of removing gaseous acid gas of the group consisting of carbon dioxide and hydrogen sulfide from admixture with gaseous $C_1$—$C_3$ alkane hydrocarbons which comprises contacting said gaseous admixture with about 5 to 150 gallons of an absorbent, consisting essentially of a solvent of the group consisting of malononitrile, succinonitrile, glutaronitrile, and admixtures thereof, per M c.f. of said gaseous mixture measured at 14.7 p.s.i.a. and 60° F., at a temperature of about —20° to 100° F. and a pressure of about 100 to 1500 p.s.i.g., and separating the unabsorbed components of said gaseous admixture from said absorbent.

8. The process of removing gaseous acid gas selected from the group consisting of carbon dioxide and hydrogen sulfide from admixture with gaseous $C_1$—$C_3$ alkane hydrocarbons which comprises contacting said gaseous admixture in a first contacting zone with a mixture of a first solvent consisting essentially of at least one low-molecular-weight dinitrile of the formula, NC—R—CN, wherein R is a lower alkylene group, and a second higher boiling solvent adapted to selectively absorb said first solvent; separately withdrawing a liquid stream and a gaseous stream comprising vaporized first solvent and unabsorbed components of said gaseous admixture fed to said first contacting zone from said first contacting zone; passing said gaseous stream through a cooling zone whereby part of said gaseous stream is condensed; separately withdrawing condensate and uncondensed components of said gaseous stream from said first cooling zone; combining said condensate with said liquid stream from said first contacting zone, and separating said second solvent from the combined solution; contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from said second contacting zone; contacting the gaseous stream from said second contacting zone in a third contacting zone with said second solvent, under conditions resulting in absorption of vaporized first solvent; separately withdrawing from said third contacting zone the unabsorbed components of the gaseous stream from said second contacting zone and said second solvent containing absorbed first solvent; recycling said second solvent from said third contacting zone to said first contacting zone; and separating the absorbed acid gas from said spent first solvent.

9. The process according to claim 8 in which said acid gas is carbon dioxide and said first solvent consists essentially of a solvent selected from the group consisting of malononitrile, succinonitrile, glutaronitrile, and mixtures thereof.

10. The process according to claim 9 in which the uncondensed components of said gaseous stream are passed through said second contacting zone at superatmospheric pressure in countercurrent contact with said first solvent.

11. The process according to claim 10 in which the pressure of said spent first solvent is reduced in a desorbing zone to flash-off acid gas, and the acid gas separated from said spent first solvent in said desorbing zone is contacted with said second solvent in a fourth contacting zone whereby entrained vaporized first solvent is absorbed.

References Cited

UNITED STATES PATENTS

| 2,139,375 | 12/1938 | Millar et al. | 55—73 |
| 2,781,863 | 2/1957 | Bloch et al. | 55—73 |
| 2,863,527 | 12/1958 | Herbert et al. | |
| 2,926,751 | 3/1960 | Kohl et al. | 55—68 |
| 3,097,917 | 7/1963 | Dotts et al. | 55—73 |

FOREIGN PATENTS

| 596,692 | 4/1960 | Canada. |
| 596,693 | 4/1960 | Canada. |
| 728,444 | 4/1955 | Great Britain. |
| 750,399 | 6/1956 | Great Britain. |

OTHER REFERENCES

Degering, Ed. F.: Organic Chemistry, College Outline Series, Barnes & Noble, New York, New York, sixth edition, 1957, p. 149.

REUBEN FRIEDMAN, *Primary Examiner.*

D. TALBERT, S. FEINBERG, *Assistant Examiners.*